Feb. 14, 1961
W. E. GRIMES
2,971,734
FISHING ROD HOLDER
Filed Jan. 22, 1960
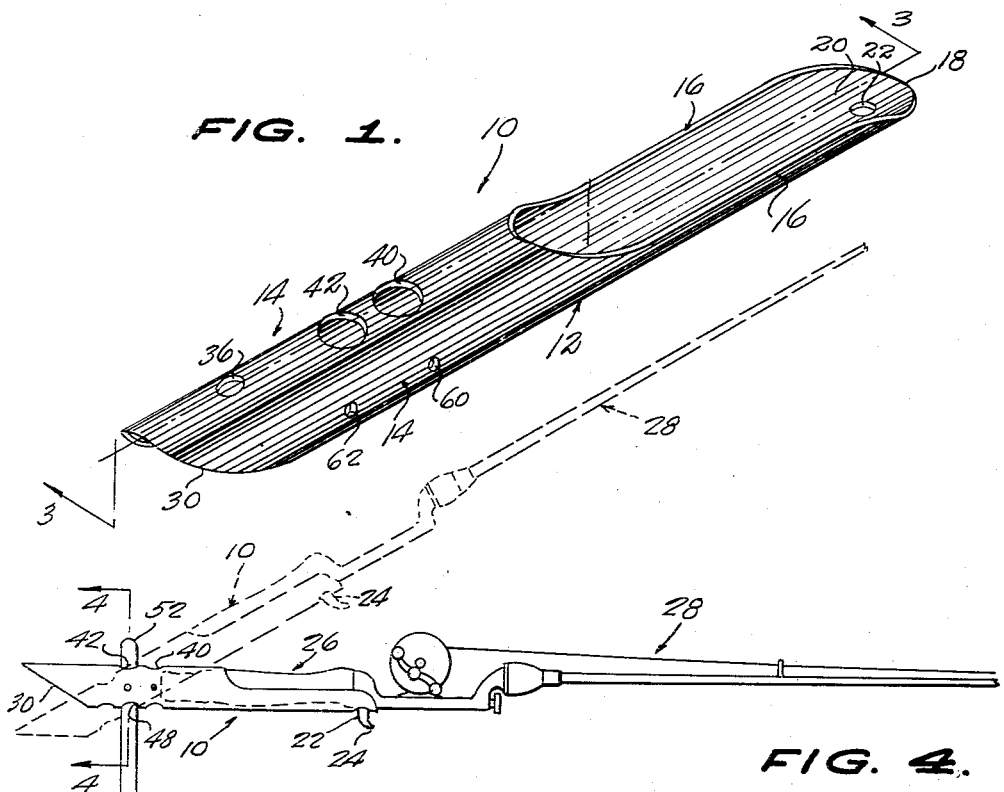
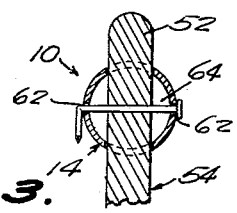
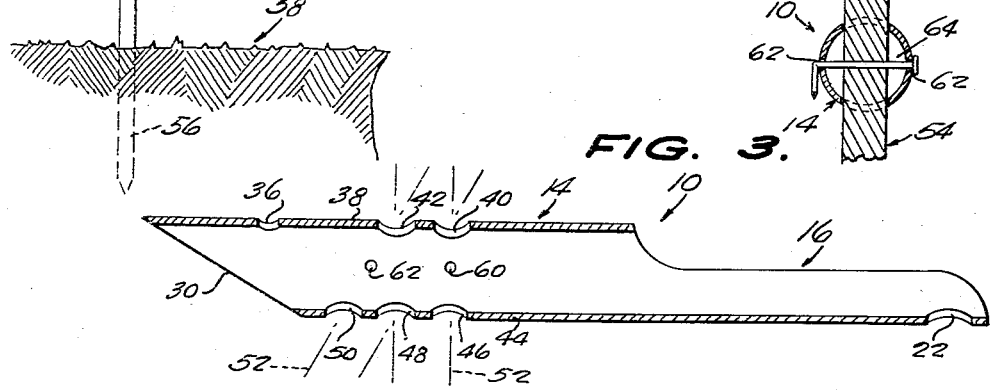
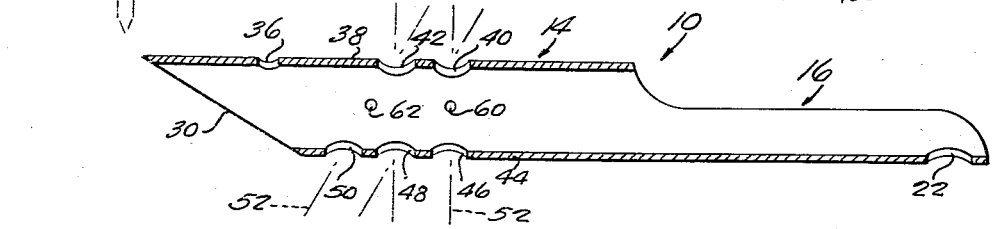
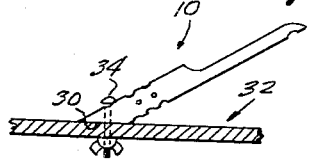
INVENTOR.
WILLIAM F. GRIMES,
BY
McMorrow, Berman + Davidson
ATTORNEYS.

United States Patent Office 2,971,734
Patented Feb. 14, 1961

2,971,734
FISHING ROD HOLDER
William E. Grimes, 117 W. Delaware St., Fairfield, Ill.
Filed Jan. 22, 1960, Ser. No. 4,086
6 Claims. (Cl. 248—44)

This invention relates to a novel and improved fishing rod holder for holding fishing rods in either horizontal or angled positions relative to a support, as in bank fishing.

The primary object of the invention is the provision of a more efficient and more conveniently usable and inexpensive device of the kind indicated, which is small enough and lightweight enough to be carried in a tackle box, and which, in one form, requires no special stake for the mounting thereof on a support, such as a lake or stream bank, but can utilize any available throwaway stake, such as a piece of wood, which can be left in place or discarded when leaving a fishing site, so that such stake need not be carried and stored, as in the case of a stake which is a permanent component of such a device.

Another object of the invention is to provide a simple device of the character indicated above which consists of a one-piece body which is supplemented only by mounting means, such as a nail, for securing the body to an available stake, or a bolt for securing the body to a support such as a deck or floor, in an upwardly angled position, the mounting means serving the further purpose of a stop for preventing a fishing rod handle from sliding downwardly or rearwardly in the body.

Other important objects and advantageous features of the invention will be apparent from the following description and the accompanying drawings, wherein, for purposes of illustration only, a specific form of the invention is set forth in detail.

In the drawings:

Figure 1 is a perspective view of a device of the present invention;

Figure 2 is a schematic view, on a reduced scale, showing the device mounted on a stake driven into a stream or lake bank, with a fishing rod handle engaged in the device, the device and the rod being shown mounted in horizontal position in full lines, and in an upwardly angled position in phantom lines;

Figure 3 is a longitudinal section taken on the line 3—3 of Figure 1, with phantom lines showing available different angular engagements of the device with a stake;

Figure 4 is an enlarged vertical transverse section taken on the line 4—4 of Figure 2; and Figure 5 is a side elevation, on a reduced scale, and partly in section, showing angular mounting of the device on a horizontal support.

Referring in detail to the drawings, wherein like numerals designate like parts throughout the several views, the illustrated device, generally designated 10, comprises an elongated straight tubular body 12, which is preferably made of plastic, but can be made of suitable light-weight non-corrosive metal.

The body 12 comprises a uniformly cylindrical rear tubular portion 14 from which extends forwardly a straight, longitudinally elongated semi-tubular, concavo-convex portion 16 which is aligned with and disposed at the lower side of the tubular rear portion 14, the portions 14 and 16 being preferably continuous and integral with each other. The forward portion 16 has a rounded forward end 18, and is formed in its bottom wall 20, near the forward end 18 with a hole 22 to receive and anchor a finger-piece 24 on the forward end of the handle 26 of a fishing rod 28, when the handle 26 is engaged in the device 10.

The tubular rear portion 14 terminates at its rear end in a bevelled end 30, which is angled forwardly and downwardly relative to the device 10, at an angle of preferably forty-five degrees, so that the bevelled end 30 can be supportably engaged, at an upward angle, with a horizontal support, as shown in Figure 5, such as a deck or floor 32, and secured thereon by suitable mounting means, such as a bolt 34, which is extended downwardly through a hole 36 which is formed in the top wall 38 of the tubular rear portion 14. The presence of the bolt 34, extending across the interior of the tubular rear portion 14, at the rear end thereof, serves as a stop for the rear end of a fishing rod handle 26 disposed in the portion 14.

The tubular rear portion 14 of the device 10 is formed, intermediate its ends, in its top wall 38 with a pair of longitudinally spaced upper stake-receiving holes 40 and 42, and in its bottom wall 44, with lower stake-receiving holes which include two forward holes 46 and 48, and a single rear hole 50. The forward holes 46 and 48 are diametrically and vertically aligned with the upper holes 40 and 42, respectively, while the rear lower hole 50 is spaced rearwardly from the forward holes.

This arrangement of the stake-receiving holes is provided so that the upper end portion 52 of any suitable stake 54, having a lower end portion 56 driven perpendicularly into the ground, such as a stream or lake bank 58, can be selectively engaged through upper and lower holes, as indicated in Figure 3, for supporting the device 10 in a horizontal position, as shown in full lines in Figure 2, or at an upward angle, as shown in phantom lines, therein.

The rear tubular portion 14 of the device 10 is provided in opposite side walls thereof, in line with the upper holes 40 and 42 and the forward lower holes 46 and 48, respectively, with diametrically aligned forward and rear holes 60 and 62, respectively, to selectively receive mounting means, such as a nail 64, driven through the upper portion 52 of a stake 54, for holding the device 10 in position on the stake 54. In this case, the upper stake portion 52 and the nail 64 serve as a stop, against which the rear end of the fishing rod handle 26 is adapted to bear, to prevent the rod handle from sliding rearwardly and/or downwardly in the device 10. It is obvious that when fishing activity is over, the device 10 can be left on the stake 54, but in the usual case that the device 10 is to be removed and carried away by the fisherman in leaving the fishing site, merely removing the nail 64 from the holes 60, 62 enables the device 10 to be removed from the stake and stored in a tackle box, the stake 54 either being left standing or being discarded.

The above described device can be successfully used to hold both fishing rods and poles. The holes 40, 42 and 46, 48, and 50 can be made in different sizes to accommodate stakes of different diameters. Use of the nail 64 can be dispensed with, in specific cases, if desired.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fishing rod holder comprising an elongated rod handle receiving body having a tubular rear portion and a concavo-convex forward portion, and combined stop and mounting means connected to said tubular portion for mounting said body on a support, said tubular portion having top, bottom, and side walls, and said combined means comprising longitudinally spaced upper holes in said top wall, longitudinally spaced holes in said bottom wall, a ground-anchored perpendicular stake having an upper end portion engaged through selected ones of the upper and lower holes, the upper end portion of the stake present in said tubular portion serving as a fishing rod handle stop.

2. A fishing rod holder comprising an elongated rod handle receiving body having a tubular rear portion and a concavo-convex forward portion, and combined stop and mounting means connected to said tubular portion for mounting said body on a support, said tubular portion having top, bottom, and side walls, and said combined means comprising longitudinally spaced upper holes in said top wall, longitudinally spaced holes in said bottom wall, a ground-anchored perpendicular stake having an upper end portion engaged through selected ones of the upper and lower holes, the upper end portion of the stake present in said tubular portion serving as a fishing rod handle stop, and a pin extending through said side walls and the upper end portion of the stake.

3. A fishing rod holder comprising an elongated rod handle receiving body having a tubular rear portion and a concavo-convex forward portion, and combined stop and mounting means connected to said tubular portion for mounting said body on a support, said tubular portion having top, bottom, and side walls, and said combined means comprising longitudinally spaced upper holes in said top wall, longitudinally spaced holes in said bottom wall, a ground-anchored perpendicular stake having an upper end portion engaged through selected ones of the upper and lower holes, the upper end portion of the stake present in said tubular portion serving as a fishing rod handle stop, and a pin extending through said side walls and the upper end portion of the stake, some of said upper and lower holes being in vertical alignment with each other, and at least one lower hole being disposed behind the upper holes, with the upper end portion of the stake engaged through said one lower hole and an upper hole.

4. A fishing rod holder comprising an elongated rod handle receiving body having a tubular rear portion and a concavo-convex forward portion, and combined stop and mounting means connected to said tubular portion for mounting said body on a support, said tubular portion having top, bottom, and side walls, and said combined means comprising longitudinally spaced upper holes in said top wall, longitudinally spaced holes in said bottom wall, a ground-anchored perpendicular stake having an upper end portion engaged through selected ones of the upper and lower holes, the upper end portion of the stake present in said tubular portion serving as a fishing rod handle stop, and a pin extending through said side walls and the upper end portion of the stake, said concavo-convex forward portion having a forward end, and a bottom wall formed with a fishing rod handle fingerpiece receiving hole.

5. A fishing rod holder comprising a one-piece elongated straight body consisting of a tubular rear portion and a semi-tubular concavo-convex forward portion, and combined fishing rod handle stop and holder mounting means connected to said tubular rear portion, said forward portion having a bottom wall and a forward end, said bottom wall being formed with a rod handle fingerpiece receiving opening, said tubular portion having top and bottom walls formed with aligned upper and lower stake receiving holes which are components of said combined means, and an otherwise unconnected ground-engaging throw-away stake having an end portion engaged through selected upper and lower holes, said stake end portion being a component of said combined means.

6. A fishing rod holder comprising a one-piece elongated straight body consisting of a tubular rear portion and a semi-tubular concavo-convex forward portion, and combined fishing rod handle stop and holder mounting means connected to said tubular rear portion, said forward portion having a bottom wall and a forward end, said bottom wall being formed with a rod handle fingerpiece receiving opening, said tubular portion having top and bottom walls formed with aligned upper and lower stake receiving holes which are components of said combined means, and an otherwise unconnected ground-engaging throw-away stake having an end portion engaged through selected upper and lower holes, said stake end portion being a component of said combined means, said combined means further comprising a pin extending through said tubular portion and the stake end portion.

References Cited in the file of this patent

UNITED STATES PATENTS

| | | |
|---|---|---|
| 1,352,663 | Hafner | Sept. 14, 1920 |
| 2,033,007 | Raithel | Mar. 3, 1936 |
| 2,473,778 | Benes | June 21, 1949 |
| 2,724,569 | Licata | Nov. 22, 1955 |